United States Patent
Zhang et al.

(10) Patent No.: US 9,516,277 B2
(45) Date of Patent: *Dec. 6, 2016

(54) FULL SPEED LANE SENSING WITH A SURROUNDING VIEW SYSTEM

(71) Applicant: GM GLOBAL TECHNOLOGY OPERATIONS LLC, Detroit, MI (US)

(72) Inventors: Wende Zhang, Troy, MI (US); Bakhtiar Brian Litkouhi, Washington, MI (US); Kent S. Lybecker, Rochester, MI (US)

(73) Assignee: GM Global Technology Operations LLC, Detroit, MI (US)

(*) Notice: Subject to any disclaimer, the term of this patent is extended or adjusted under 35 U.S.C. 154(b) by 587 days.

This patent is subject to a terminal disclaimer.

(21) Appl. No.: 13/859,628

(22) Filed: Apr. 9, 2013

(65) Prior Publication Data

US 2013/0293717 A1 Nov. 7, 2013

Related U.S. Application Data

(60) Provisional application No. 61/641,479, filed on May 2, 2012.

(51) Int. Cl.
*H04N 7/18* (2006.01)
*G06K 9/00* (2006.01)

(52) U.S. Cl.
CPC .......... *H04N 7/181* (2013.01); *G06K 9/00798* (2013.01)

(58) Field of Classification Search
USPC ................................. 348/148, 149; 382/104
See application file for complete search history.

(56) References Cited

U.S. PATENT DOCUMENTS 4,970,653 A * 11/1990 Kenue ........................... 701/301
5,351,044 A * 9/1994 Mathur et al. ................ 340/901
(Continued)

FOREIGN PATENT DOCUMENTS

| JP | 2012-128714 (A) | 7/2012 | |
| WO | WO 2010079912 A1 * | 7/2010 | |
| WO | WO 2010134680 A1 * | 11/2010 | ........... B62D 15/029 |

OTHER PUBLICATIONS

Pagel, Calibration of Non-Overlapping Cameras in Vehicles, Jun. 21-24 2010, 2010 IEEE Intelligent Vehicles Symposium p. 1178 to 1183.*

(Continued)

*Primary Examiner* — Frederick Bailey
(74) *Attorney, Agent, or Firm* — John A. Miller; Miller IP Group, PLC

(57) ABSTRACT

A system and method for providing lane sensing on a vehicle by detecting roadway lane-markers, where the system employs a surround view camera system providing a top-down view image around the vehicle. The method includes detecting left-side and right-side lane boundary lines in the top-down view image, and then determining whether the lane boundary lines in the image are aligned from one image frame to a next image frame and are aligned from image to image in the top-down view image. If the boundary lines are not aligned, then calibration of one or more of the cameras is performed, and if the lines are aligned, then a model fitting process is used to specifically identify the location of the boundary lines on the roadway.

19 Claims, 6 Drawing Sheets

(56) References Cited

U.S. PATENT DOCUMENTS

| | | | | |
|---|---|---|---|---|
| 5,555,312 | A | * | 9/1996 | Shima et al. ............... 382/104 |
| 5,991,427 | A | * | 11/1999 | Kakinami et al. ........... 382/104 |
| 6,005,492 | A | * | 12/1999 | Tamura et al. .............. 340/937 |
| 6,172,600 | B1 | | 1/2001 | Kakinami et al. ........... 340/435 |
| 6,819,779 | B1 | * | 11/2004 | Nichani ....................... 382/104 |
| 7,050,908 | B1 | | 5/2006 | Schwartz et al. ............ 701/300 |
| 7,295,682 | B2 | * | 11/2007 | Otsuka et al. ............... 382/103 |
| 7,421,095 | B2 | * | 9/2008 | Ikeda et al. ................. 382/104 |
| 7,502,048 | B2 | * | 3/2009 | Okamoto ................. B60R 1/00 348/148 |
| 7,561,181 | B2 | * | 7/2009 | Schofield et al. ............ 348/148 |
| 7,898,400 | B2 | * | 3/2011 | Hadi ....................... B60Q 5/00 340/435 |
| 2002/0167589 | A1 | * | 11/2002 | Schofield ................ B60N 2/002 348/148 |
| 2003/0085999 | A1 | * | 5/2003 | Okamoto et al. ............ 348/148 |
| 2005/0240342 | A1 | * | 10/2005 | Ishihara et al. .............. 701/208 |
| 2007/0263090 | A1 | * | 11/2007 | Abe ............................ 348/148 |
| 2008/0036855 | A1 | * | 2/2008 | Heenan ......................... 348/61 |
| 2008/0317288 | A1 | * | 12/2008 | Aoki et al. ................... 382/104 |
| 2010/0002911 | A1 | * | 1/2010 | Wu et al. ..................... 382/104 |
| 2010/0014714 | A1 | | 1/2010 | Zhang |
| 2010/0098295 | A1 | | 4/2010 | Zhang |
| 2010/0201814 | A1 | | 8/2010 | Zhang |
| 2010/0284569 | A1 | * | 11/2010 | Sakurai ..................... G06T 3/00 382/103 |
| 2011/0216194 | A1 | * | 9/2011 | Kosaki ..................... H04N 7/18 348/148 |
| 2011/0285848 | A1 | * | 11/2011 | Han et al. ..................... 348/148 |
| 2012/0062745 | A1 | * | 3/2012 | Han ....................... B62D 15/029 348/148 |
| 2012/0215377 | A1 | | 8/2012 | Takemura |
| 2012/0221207 | A1 | | 8/2012 | Nakamura |

OTHER PUBLICATIONS

Ieng, A New Multi-Lanes Detection Using Multi-Camera for Robust Vehicle Location, 2005 IEEE Intelligent Vehicles Symposium p. 700-705.*

Jeong, Real—Time Lane Detection for Autonomous Navigation, Aug. 25-29, 2001, 2001 IEEE Intelligent Vehicles Symposium p. 508-513.*

Xu, A Vision Navigation Algorithm Based on Linear Lane Model, Oct. 3-5, 2000, IEEE Intelligent Vehicles Symposium 2000, p. 240-245.*

Jung, A Lane Departure Warning System based on a Linear-parabolic lane model, Jun. 14-17, 2004, 2004 IEEE Intelligent Vehicles Symposium p. 891-895.*

Zhang Wenge, et al. "Lane Tracking System", U.S. Appl. No. 13/589,214, filed Aug. 20, 2012.

Broggi Alberto, et al. "The Passive Sensing Suite of the TerraMax Autonomous Vehicle" IEEE Intelligent Vehicles Symposium, Eindhoven University of Technology, Eindhoven, The Netherlands, Jun. 4-6, 2008, pp. 769-774.

* cited by examiner

US 9,516,277 B2

FULL SPEED LANE SENSING WITH A SURROUNDING VIEW SYSTEM

CROSS-REFERENCE TO RELATED APPLICATIONS

This application claims the benefit of the priority date of U.S. Provisional Patent Application Ser. No. 61/641,479, titled, Full Speed Lane Sensing With A Surrounding View System, filed May 2, 2012.

BACKGROUND OF THE INVENTION

1. Field of the Invention

This invention relates generally to a system and method for providing roadway lane sensing for a vehicle traveling in the lane and, more particularly, to a system and method for providing roadway lane sensing on a vehicle traveling within the lane, where the lane sensing system employs an algorithm that uses a top-down view image generated from four cameras that provide images all the way around the vehicle.

2. Discussion of the Related Art

Modern vehicles are becoming more autonomous, i.e., vehicles are able to provide driving control with less driver intervention. Cruise control systems have been on vehicles for a number of years where the vehicle operator can set a particular speed of the vehicle, and the vehicle will maintain that speed without the driver operating the throttle. Adaptive cruise control systems have been recently developed in the art where not only does the system maintain the set speed, but also will automatically slow the vehicle down in the event that a slower moving vehicle is detected in front of the subject vehicle by using various sensors, such as radar and cameras. Modern vehicle control systems may also include autonomous parking where the vehicle will automatically provide the steering control for parking the vehicle, and where the control system will intervene if the driver makes harsh steering changes that may affect vehicle stability and lane centering capabilities, where the vehicle system attempts to maintain the vehicle near the center of the travel lane.

As vehicle systems improve, vehicle's will become more autonomous with the goal being a completely autonomously driven vehicle. Future vehicles will likely employ autonomous systems for lane changing, passing, turns away from traffic, turns into traffic, etc. As these systems become more prevalent in vehicle technology, it will also be necessary to determine what the driver's role will be in combination with these systems for controlling vehicle speed, steering and overriding the autonomous system.

Current vehicle lane sensing systems typically use vision systems to sense the vehicle travel lane and drive the vehicle in the lane-center. Many of these known lane sensing systems detect lane-markers on the road for various applications, such as lane departure warning (LDW), lane keeping (LK), lane centering (LC), etc., and have typically employed a single camera, either at the front or rear of the vehicle, to provide the images that are used to detect the lane-markers. However, there are various situations where a single camera may not be able to detect the lane-markers, including a low sun angle, non-visible lane markings as a result of close proximity vehicles, such as in congested traffic situations, camera failure, etc. For example, when a leading-vehicle is too close to the subject vehicle, due to traffic congestion or other traffic situations, the camera may not detect the lane-markers because the lane-markers are hidden by the leading-vehicle, and thus, lane-marker detection of the lane will fail.

It has been proposed in the art to provide a surround view camera system on a vehicle that includes a front camera, a rear camera and left and right side cameras, and that generates a top-down view of the vehicle and surrounding areas using the images from the cameras, where the images would overlap each other at the corners of the vehicle. The top-down view can be displayed for the vehicle driver to see what is surrounding the vehicle for back-up, parking, etc.

SUMMARY OF THE INVENTION

In accordance with the teachings of the present invention, a system and method are disclosed for providing lane sensing on a vehicle by detecting roadway lane-markers, where the system employs a surround view camera system providing a top-down view image around the vehicle. The method includes detecting left-side and right-side lane boundary lines in the top-down view image, and then determining whether the lane boundary lines in the image are aligned from one image frame to a next image frame and are aligned from image to image in the top-down view image. If the boundary lines are not aligned, then calibration of one or more of the cameras is performed, and if the lines are aligned, then a model fitting process is used to specifically identify the location of the boundary lines on the roadway.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for providing vehicle lane sensing by detecting lane-markers using a surround view camera system is merely exemplary in nature, and is in no way intended to limit the invention or its applications or uses.

Figure 1:
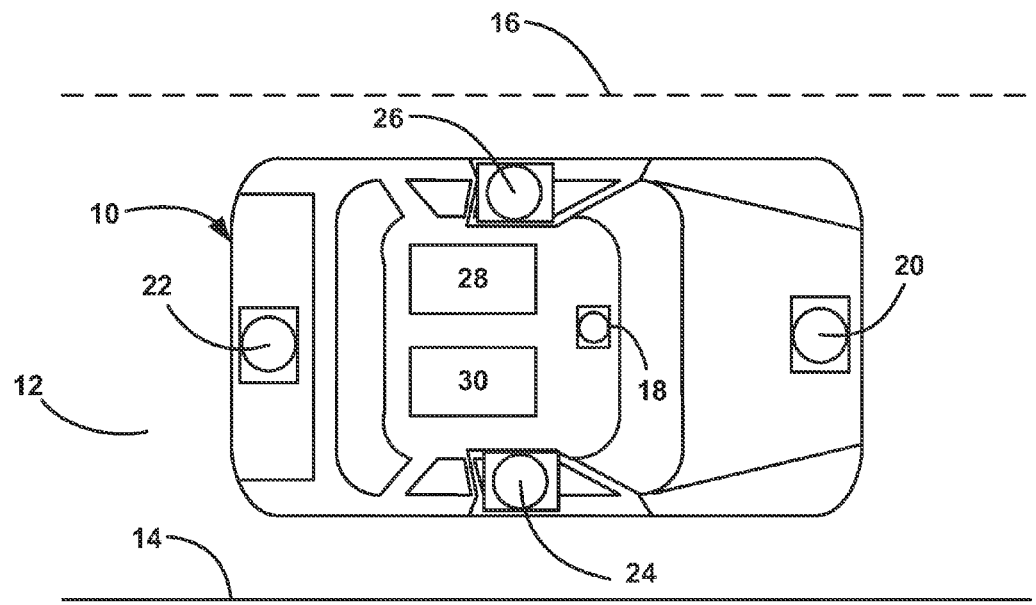
FIG. 1 is an illustration of a vehicle including a surround view camera system having multiple cameras.

FIG. 1 is an illustration of a vehicle 10 traveling along a roadway lane 12 that is defined by lane-markers painted or otherwise affixed on the roadway lane 12 including a solid outside lane boundary line 14 and a dashed lane center line 16. The vehicle 10 includes a camera 18 within the vehicle 10, such as behind the rear-view mirror (not shown), for reasons that will become apparent from the discussion below. The vehicle 10 also includes a surround view camera system having a front-view camera 20, a rear-view camera 22, a right-side view camera 24 and a left-side view camera 26. The cameras 20-26 can be any camera suitable for the purposes described herein, many of which are known in the automotive art, that are capable of receiving light, or other radiation, and converting the light energy to electrical signals in a pixel format using, for example, charged coupled devices (CCD). The cameras 20-26 generate frames of image data at a certain data frame rate that can be stored for subsequent processing. The cameras 20-26 can be mounted within or on any suitable structure that is part of the vehicle 10, such as bumpers, facie, grill, side-view mirrors, door panels, etc., as would be well understood and appreciated by those skilled in the art. In one non-limiting embodiment, the side cameras 24 and 26 are mounted under the side view mirrors and are pointed downwards. Image data from the cameras 20-26 is sent to a processor 28 that processes the image data to generate images that can be displayed on a vehicle display 30. For example, as mentioned above, it is known in the art to provide a top-down view of a vehicle that provides images near and on all sides of the vehicle 10.

Figure 2:
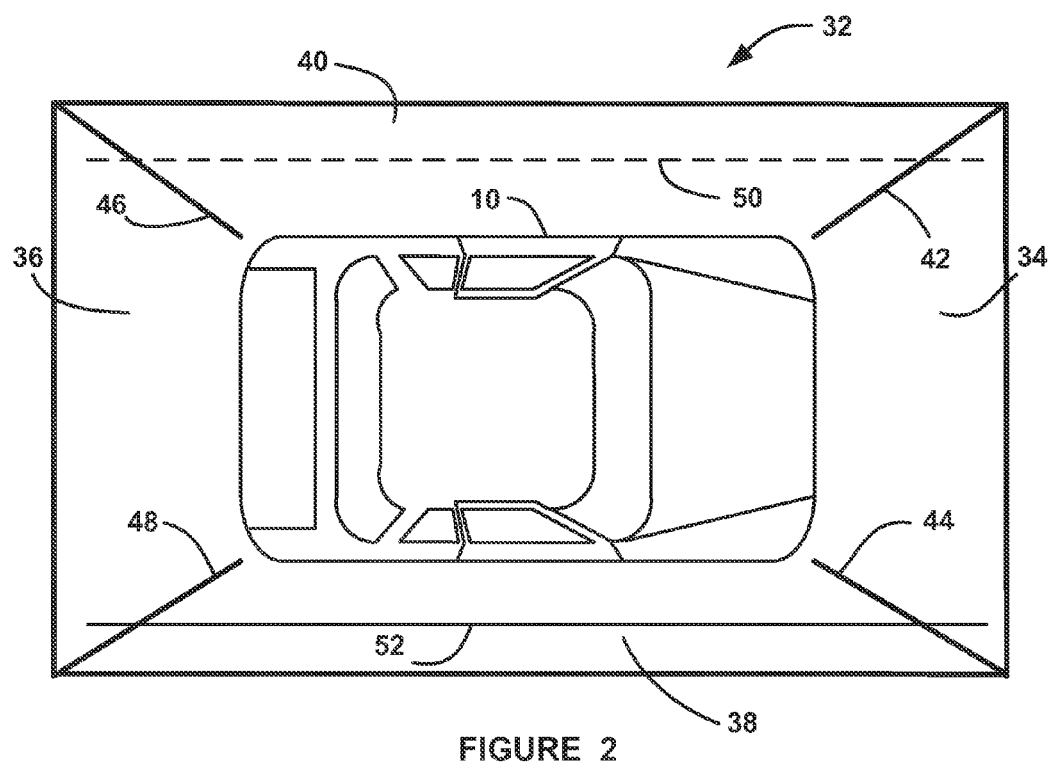
FIG. 2 is a top-down view image of the vehicle shown in FIG. 1 generated using images from the cameras.

FIG. 2 is a general representation of a top-down view image 32 constructed from image data from the cameras 20-26 that can be displayed on the display 30 showing the vehicle 10 at the center or other portion of the image 32. The top-down image 32 includes a combined front image 34 provided by the front-view camera 20, rear image 36 provided by the rear-view camera 22, right-side image 38 provided by the right-side view camera 24 and left-side image 40 provided by the left-side view camera 26. The images from the cameras 20-26 are processed by the processor 28 so that they fit together as the combined image, where line 42 is the boundary between the images 34 and 40, line 44 is the boundary between the images 34 and 38, line 46 is the boundary between the images 36 and 40 and line 48 is the boundary between the images 36 and 38. Dashed line 50 in the image 32 defines the center lane line 16 and extends through the image 40 and into the images 34 and 36, and solid line 52 represents the lane boundary line 14 that extends through the image 38 and into the images 34 and 36.

The present invention proposes a technique for providing lane sensing for use in various systems, such as LDW systems, LK systems, LC systems, etc., that uses the surround view camera system to detect lane-markers or lane boundaries on both sides of the vehicle 10. As will be discussed in detail below, the present invention proposes two lane sensing approaches including a less complex low-end approach that uses the top-down view image 32 generated by the camera system and a high-end approach that uses the images from the cameras 20-26 individually. In the low-end approach, the integrated sensing and camera diagnosis is provided seamlessly, and is simple and fast. However, the low-end approach has a limited detection range, relies on accurate camera calibration and has limited diagnosis and auto camera calibration. The high-end approach requires more processing power, and it is thus slower. However, providing the four separate raw images provides analysis in overlapping regions of the images 34-40, a longer detection range, and robust detection results. It is noted that although the present invention takes advantage of four cameras providing a surround view image of the vehicle 10, the techniques and processes of the present invention discussed in detail below will be applicable to any number of cameras, for example, if one of the cameras 20-26 fails, or more than four cameras are provided on the vehicle 10.

Figure 3:
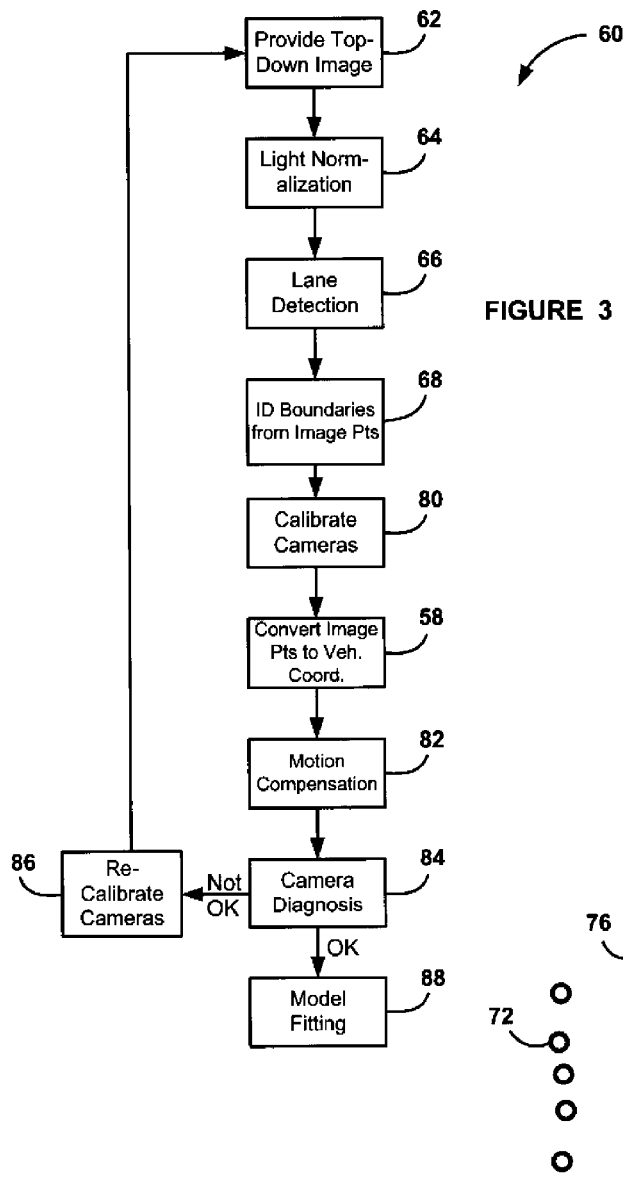
FIG. 3 is a flow chart diagram showing a low-end approach process for detecting roadway lane-markers using the surround view camera system and a top-down view image.

FIG. 3 is flow chart diagram 60 showing a process for performing the low-end approach referred to above. The top-down view image 32 is provided at box 62, and the lane sensing algorithm in the processor 28 performs light normalization on the image 32 at box 64. Light normalization is a process that changes the range of pixel intensity values of the image to bring the image intensity into a range that is more suitable for processing. U.S. patent application Ser. No. 13/589,214, filed Aug. 20, 2012, titled Lane Tracking System, assigned to the assignee of this application and herein incorporated by reference, discloses a vehicle lane tracking system that employs a single camera for detecting road markings for lane sensing purposes. The '214 application discloses one process for performing light normalization on a camera image that is suitable for the light normalization discussed herein. That process includes employing histogram equalization to increase the clarity of the images in low light conditions and providing bright spot saturation.

The algorithm then performs a lane detection process at box 66 to determine whether the vehicle 10 is traveling in a roadway lane, such as the lane 12. U.S. Patent Application Publication No. 2010/0014714 to Zhang et al., assigned to the assignee of this application and herein incorporated by reference, discloses one exemplary technique for providing lane detection that is suitable for the process discussed herein. Other techniques may also be applicable, including known techniques where objects imaged by the cameras 20-26 generate image points, discussed in more detail below, that are then processed to identify the lane boundaries. The image points are produced in image coordinates from the pixilation of the cameras 20-26 for each image frame generated as the vehicle 10 moves along the roadway lane 12.

The image points are then used to identify left and/or right boundary lines in the image 32, such as the lane lines 50 and 52, from the several image points generated by the lane detection process at box 68. In other words, the algorithm selects those points in the image that may be points detected by imaging the lane lines 14 and 16. The left and right lane lines 50 and 52 can be identified from the image points in the image 32 by any suitable process known to those skilled in the art. For example, the '214 application discloses one suitable technique where the boundary line image points are identified by the images from the cameras 20-26 as the vehicle 10 moves.

The image points in the image coordinates are then used to calibrate the orientation of the cameras 20-26 at box 80 prior to the image points being converted to the vehicle coordinate frame. U.S. Patent Application Publication No. 2010/0201814, filed Feb. 6, 2009, titled Camera Auto-Calibration By Horizontal Estimation, assigned to the assignee of this application and herein incorporated by reference, discloses an auto-calibration process for a vehicle camera that is suitable for this purpose. As discussed in the '814 application, knowledge of the position and orientation (angle) of a vehicle camera is necessary to process the image data from the camera in vehicle coordinates. However, various factors, such as load on the vehicle, traveling over rough roads, wear, etc., may cause the orientation of a vehicle camera to change, where the new camera position and orientation needs to be calibrated to a known orientation so that the images therefrom are properly processed in the image processing for the particular use. Although any suitable camera calibration process can be used for the process discussed herein, the '814 application offers one technique that is applicable, and that employs edge detection analysis and motion mapping to calibrate the vehicle cameras 20-26 using the image points.

Figure 4:
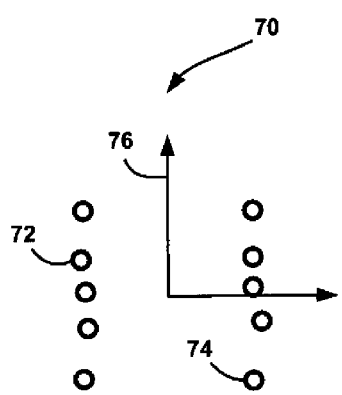
FIG. 4 is an illustration of lane-marker image points in vehicle coordinates detected by the surround view camera system using the top-down view image.

Once the cameras 20-26 are calibrated, the calibrated image points in the image coordinates are then converted to the vehicle coordinate frame using any suitable process at box 58. FIG. 4 is an illustration 70 showing that the image points have been converted to a vehicle coordinate frame 76. Particularly, a series of image points 72 in vehicle coordinates are shown that are generated by the conversion process from the image points that identify the center lane line 50 in the image 32 and a series of image points 74 in vehicle coordinates are shown that are generated by the conversion process from the image points that identify the lane line 52 in the image 32.

Vehicle motion compensation can be used to enhance the identification of the lanes lines 50 and 52 in the image 32 at box 82. Particularly, the image points 72 and 74 in the vehicle coordinates may include image points from the previous image frames provided by vehicle motion compensation. Any process for determining vehicle motion suitable for the purposes described herein can be employed. One suitable process for using vehicle motion compensation for this purpose is also described in the '042 application and could include a process for sensing the vehicle position using sensors (not shown), i.e., a vehicle speed sensor and a yaw rate sensor, on the vehicle 10 and shifting the detected image points in the previous frames in a direction of the vehicle travel to compensate for any sensed forward motion of the vehicle 10 from previous image frames to the current vehicle coordinates. As the vehicle 10 travels and each set of the image points 72 and 74 are provided in subsequent images, those points can then be used through vehicle motion compensation. In other words, the vehicle motion compensation process looks at the image points 72 and 74 in consecutive image frames where twice or more of the number of the image points 72 and 74 in the two or more frames are available for lane geometry analysis to align the image points 72 and 74 from one image frame to the next image frame based on the motion of the vehicle 10.

The algorithm then uses the motion compensated image points 72 and 74 in the vehicle coordinates to determine whether the cameras 20-26 are aligned with each other to provide the image 32 in a camera diagnosis process at box 84. If the camera diagnosis process determines that the orientation of the image points 72 and 74 from one image frame to the next image frame are not adequate for lane sensing, then the process proceeds to box 86 to provide camera re-calibration, preferably in the same manner as was done at the box 80 using the image points in the image coordinates, and then the top-down view image 32 is again generated at the box 62. If the camera diagnosis process determines that the cameras 20-26 are properly aligned and the top-down view image 32 is adequate, the algorithm performs a model fitting process at box 88 to specifically identify the position of the lines 50 and 52 in the roadway lane 12, which can then be used in the particular LDW, LK or LC system. Both the camera diagnosis process and the model fitting process will be discussed in detail below.

During the camera diagnosis process at the box 84, the algorithm provides a temporal analysis by aligning the lines 50 and 52 from one image frame to the next image frame as the vehicle 10 moves along the roadway lane 12. Consecutive image frames need to match each other where the line segments for the front, side and rear cameras from the lines 50 and 52 need to be co-linear, have the same angle and the same offset relative to each other for each line. Further, the camera diagnosis process provides a spatial analysis, where in the images 34-40 that make up the top-down view image 32, the lines 50 and 52 from one of the images 34-40 to the next image 34-40 should be connected and have the same angle. Therefore, the camera diagnosis process matches consecutive frames for the temporal constraint and matches the different images in each frame image for the spatial constraint.

Figure 5:
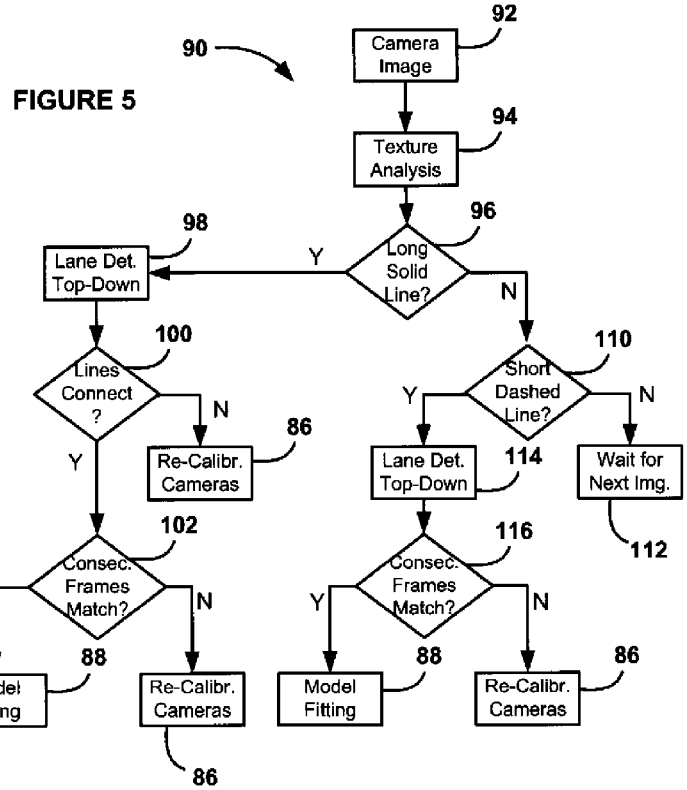
FIG. 5 is a flow chart diagram showing a process for providing camera diagnosis in the process shown in FIG. 3.

FIG. 5 is a flow chart diagram 90 showing a process for performing the camera diagnosis referred to above. Depending on whether the vehicle 10 is moving forwards or backwards, the front-view camera 20, the rear-view camera 22 or an additional internal camera, such as the camera 18, behind the windshield is used to identify whether there are lane boundaries that can be used to determine whether the cameras 20-26 are properly calibrated. At box 92, a camera image from the camera 20, the camera 22 or the internal camera is provided for texture analysis at box 94 depending on which direction the vehicle 10 is traveling. The texture analysis process provides edge and lane detection to determine whether lane boundary lines, such as the lines 50 and 52, are existing either on the left side of the vehicle 10 or the right side of the vehicle 10.

The algorithm then determines whether either of the left or right lane lines that have been detected are solid long lines at decision diamond 96, and if so, moves to box 98 to provide lane-marker or line detection using the top-down view image 32. Using the vehicle motion compensation images from the box 82, the algorithm provides the spatial constraint analysis by determining whether the line segments for the front, side and rear cameras from the lines 50 and 52 in the top-down view image 32 are connected and have the same angle between the images for each line in the top-down view image 32 within some predetermined threshold at decision diamond 100. If the line segments for the front, side and rear cameras from the lines 50 and 52 are not connected or do not have the same angle within the threshold at the decision diamond 100, the algorithm proceeds to the camera re-calibration box 86. If the line segments for the front, side and rear cameras from the lines 50 and 52 are connected and do have the same angle for each line within the threshold, the algorithm proceeds to decision diamond 102 to provide the temporal constraint analysis to determine whether the lines 50 and 52 in consecutive image frames match, as discussed above. If the consecutive frames do not match at the decision diamond 102, then the algorithm again proceeds to the camera re-calibration box 86. If both the temporal and the spatial constraints have been met, the cameras 20-26 are calibrated relative to each other and the algorithm proceeds to the model fitting box 88.

If the algorithm determines that either of the lines 50 and 52 are not solid long lines at the decision diamond 96, where the line 50 is not a solid line, the algorithm then determines whether the lines are short (dashed) lines at decision diamond 110, and if not, no lines exist in the roadway lane 12, and the algorithm proceeds to box 112 to wait for the next imaging cycle. If the algorithm determines that the detected lines are short lines at the decision diamond 110, then the algorithm provides lane-marker detection at box 114 in the same manner as the box 98. Since the lines are short lines, the algorithm skips the spatial constraint step of determining whether the line segments are connected and at the same angle, but does perform the temporal frame matching at decision diamond 116 in the same manner as discussed above for the box 102. Likewise, if the consecutive frames do not match at the decision diamond 116, then the algorithm moves to the re-calibration box 86, and if they do match, the algorithm proceeds to the model fitting box 88.

If the cameras 20-26 are calibrated, the algorithm then uses the image points 72 and 74 from consecutive image frames to identify the position and orientation of the vehicle 10 with respect to the roadway lane 12 in the model fitting box 88. In other words, the algorithm uses the images points 72 and 74 to determine the precise location of the lines 50 and 52 relative to the position of the vehicle 10 so that the exact position and orientation of the vehicle 10 can be determined in the roadway lane 12. In the model fitting process for the low-end approach, the algorithm fits a linear model using weights based on the detected lane image points 72 and 74 for both sides of the vehicle 10. Particularly, the model fitting algorithm identifies appropriate weights for each of the image points 72 and 74 for a particular system or condition, and fits those weights into the desired lane model to define the position of the lines 50 and 52. Each weight is carefully assigned based on various parameters, such as the camera view points, vehicle dynamic errors, camera calibration errors, camera visibility and reliability in the image 32. Image points from a side-view camera typically will have higher weights for lane departure warning (LDW) applications. Also, image points from previous frames with accurate motion compensation have larger weights than those with noisy motion compensation, image points with smaller camera calibration error have larger weights, and image points with better visibility and reliability in the image where closer points in the image are given larger weights. For a straight line lane model, offset and angle parameters are estimated where points closest to the vehicle's front wheels have larger weights for the estimation of the offset and robustly detected points in the previous frames far away from the vehicle 10 have larger weights for the estimation of the angle.

The image point weighting process can be any suitable weighting process that attempts to position the image points 72 and 74 to fit the model. For example, the model may be based on the function $f(x, y)=0$, where each image point 72 and 74 is placed into the function, and where $x_{s_1}$ and $y_{s_1}$ represent the location x and y values for that image point. By assigning a weight w to each particular image point 72 and 74 for the function $f$, optimization of the function $f$ is provided so that it achieves the desired result. All of the functions for each image point 72 and 74 are added together with their appropriate weight to provide optimal model parameters through, for example, the following objective function.

$$\text{Optimal model parameters} = \text{argmin} \Sigma w_{s_1} \|f(x_{s_1}, y_{s_1})\|^2$$

Each side lane-marker is observed by three cameras in the top-down view image 32 when the vehicle 10 is moving forward, namely, the front-view camera 20, the particular side-view camera 24 or 26 and the rear-view camera 22. Depending on the particular lane sensing application, such as lane centering or lane keeping, each image point 72 and 74 is weighted differently based on the parameters. For example, lane sensing for lane centering purposes is more interested in the lane forward of the vehicle 10, and therefore the image points provided by the front-view camera 20 are given more weight. For lane sensing in an LDW or LK application, the image point weighting is determined at the vehicle front wheel locations, and therefore, the side-view camera image points are given more weight. The weights may correspond to a number of reliability factors that may indicate a degree of confidence that a particular point may identify the lane boundary line. Such reliability factors may include ambient visibility, image resolution, lighting conditions, etc.

Figure 6:
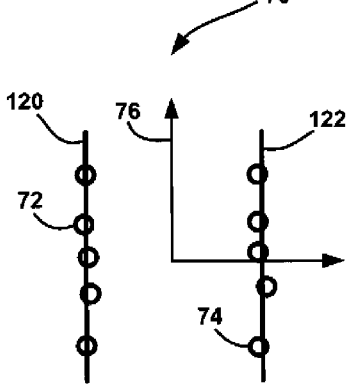
FIG. 6 is an illustration of the lane-marker image points detected by the surround view camera system shown in FIG. 4 and including lane-marker lines that have been model fit to the points.

Once a weight has been assigned to each image point 72 and 74, a model lane line is then fit to those points according to the weighted position of the points 72 and 74 to set the lane line. The lane lines 50 and 52 may be further modeled in any suitable manner, such as a weighted average, a rolling best fit, Kalman filtering, etc. FIG. 6 is an illustration of the weighted image points 72 and 74 in the vehicle coordinates as shown in FIG. 4 and including lane-marker lines 120 and 122 that have been model fit to the weighted image points 72 and 74, respectively, in the manner discussed above.

For the high-end approach where lane sensing is provided using the individual images from each of the cameras 20-26, each separate image goes through similar processing as was done for the top-down view image 32 to provide the lane-marker detection. Because the actual separate images in the top-down view image 32 are cut off to provide the top-down view image 32, using the individual images separately can extend the range of the lane sensing. Further, processing of the individual images from each of the cameras 20-26 can take advantage of the overlapping region between those images.

Figure 7:
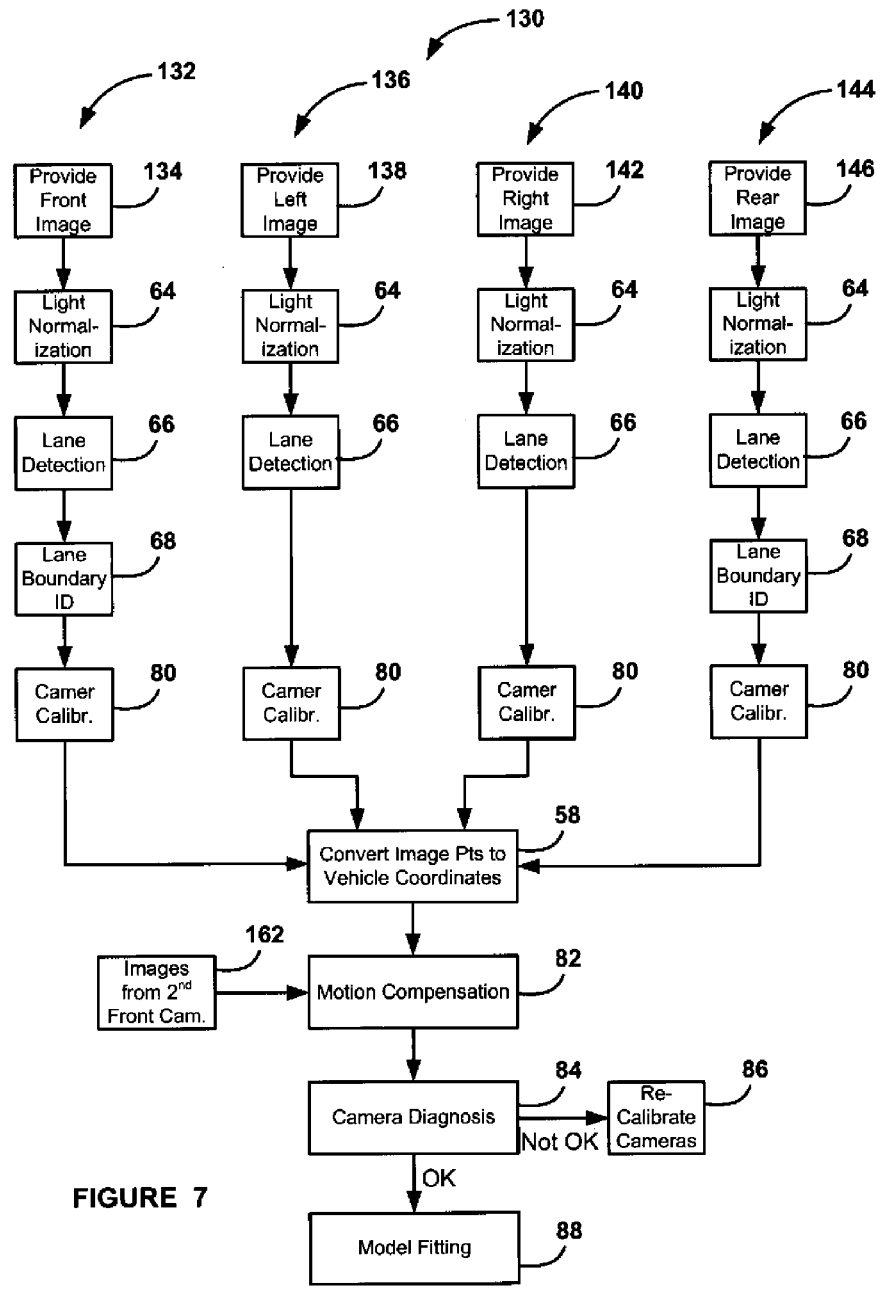
FIG. 7 is a flow chart diagram showing a high-end approach process for detecting roadway lane-markers that uses images separately from a plurality of vehicle cameras.

FIG. 7 is a flow chart diagram 130 showing a process for detecting the roadway lane lines 14 and 16 for the high-end approach that uses each of the images from the cameras 20-26 separately, where like elements to the flow chart diagram 80 are identified by the same reference number. Although four cameras are used in this embodiment, it is noted that this is by way of a non-limiting example in that any number of cameras can be employed suitable for the purposes discussed herein. In the flow chart diagram 130, the image analysis is separated into four separate paths one for each of the cameras 20-26, where a first path 132 analyzes the front image 34 provided by the front-view camera 20, which is provided at box 134, a second path 136 analyzes the side image 40 provided by the left-side view camera 26, which is provided at box 138, a third path 140 analyzes the side image 38 provided by the right-side view camera 24, which is provided at box 142, and a fourth path 144 analyzes the rear image 36 provided by the rear-view camera 22, which is provided at box 146.

Each path 132, 136, 140 and 144 analyzes the particular camera image in the same or similar manner discussed above, where light normalization is provided at the box 64 and lane detection is provided at the box 66. Left and right lane boundary identification is provided at the box 68 for the front and rear images in the paths 132 and 144, but not for the side images in the paths 136 and 140, although they could be. Using the appropriate set of image points for the particular camera, that camera is then separately calibrated in each of the paths 132, 134, 136 and 138 at the box 80. All of the image points in each of the paths 132, 136, 140 and 144 are converted to vehicle coordinates in combination for the cameras 20-26 at the box 58.

Figure 8:
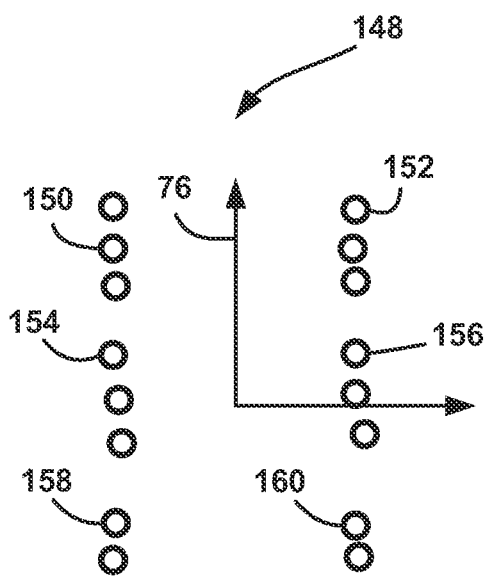
FIG. 8 is an illustration of lane-marker image points in vehicle coordinates detected by the separate cameras.

FIG. 8 is an illustration 148 of a group of image points converted to vehicle coordinates similar to the image points 72 and 74 shown in FIG. 4, where a series of image points 150 is provided by the front-view camera 20 on the left side of the vehicle 10, a series of image points 152 is provided by the front-view camera 20 on the right side of the vehicle 10, a series of image points 154 is provided by the left-side view camera 26 on the left side of the vehicle 10, a series of image points 156 is provided by the right-side view camera 24 on the right side of the vehicle 10, a series of image points 158 is provided by the rear-view camera 22 on the left side of the vehicle 10, and a series of image points 160 is provided by the right-side view camera 24 on the right side of the vehicle 10. The illustration 148 can be enhanced by providing camera images from a front camera internal to the vehicle 10, such as the camera 18 behind the vehicle windshield, at box 162.

The algorithm then accumulates more image points from previous image frames through vehicle motion compensation at the box 82, provides camera diagnosis at the box 84, provides camera re-calibration at the box 86 and provides model fitting at the box 88.

Figure 9:
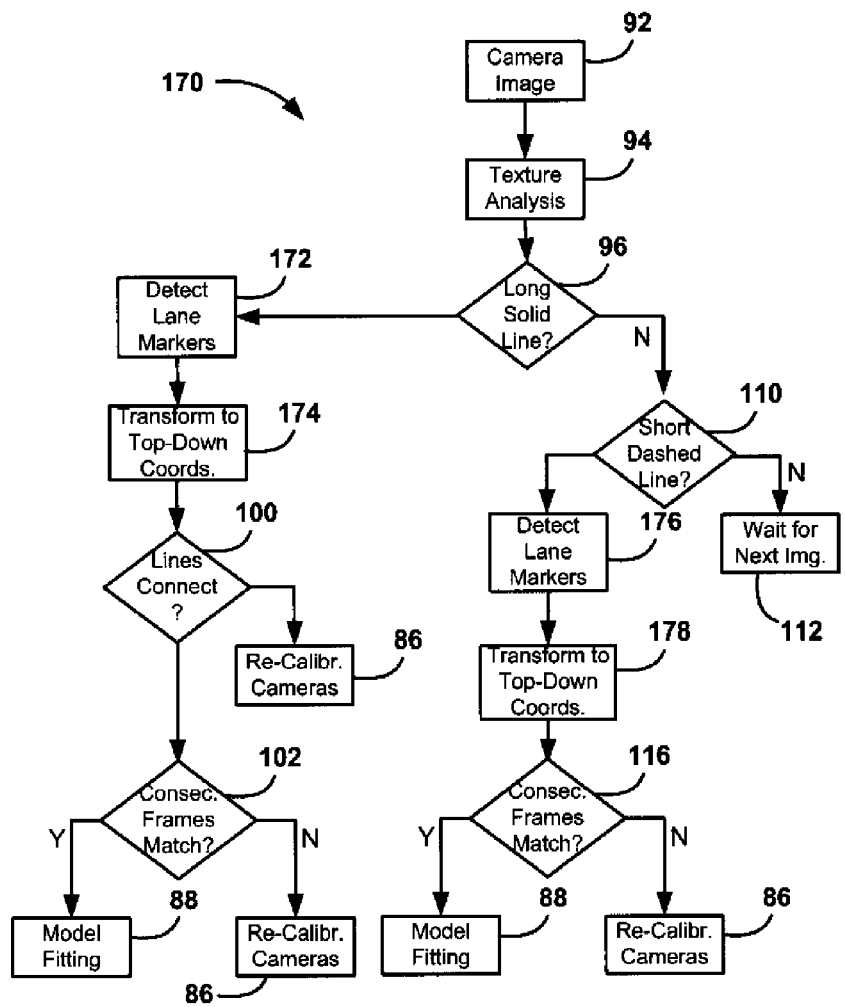
FIG. 9 is a flow chart diagram showing a process for providing camera diagnosis in the process shown in FIG. 7.

FIG. 9 is a flow chart diagram 170 showing a process for camera diagnosis used in the process shown in the flow chart diagram 130 to provide the temporal constraint for line segments in consecutive image frames for co-linearity, same angle and same offset, and the spatial constraints to determine that the lane-marker lines are straight in the images. In the flow chart diagram 170, the related processes that are performed in the camera diagnosis flow chart diagram 130 for the top-down view image 32 are the same. At box 172, if long solid lines have been detected at the decision diamond 96, then the algorithm performs the lane-marker detection on each of the four separate images separately instead of the top-down view image 32 that was done at the box 98. Once the lane-markers have been detected in each of the separate images, then the algorithm performs an additional step of transforming the detected lines to a top-down view coordinate system at box 174. If short lines are detected at the decision diamond 110, then the algorithm performs the lane-marker detection on each of the four images separately in a similar manner as was done at the box 172. Likewise, the algorithm performs the additional step of transforming the detected lines to a top-down view coordinate system at box 178.

Figure 10:
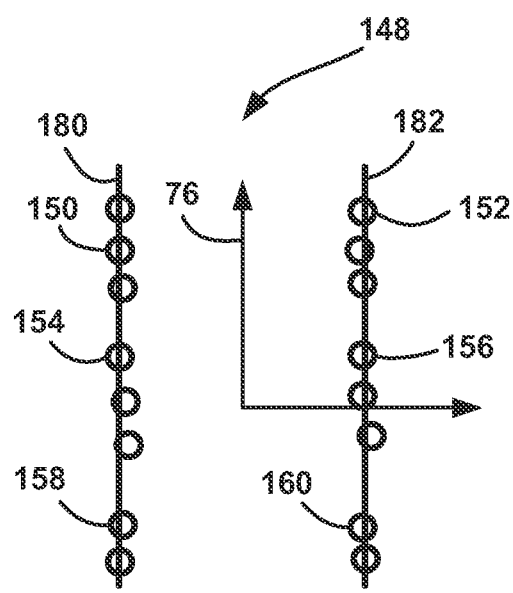
FIG. 10 is an illustration of the lane-marker image points shown in FIG. 8 and including lane-marker lines that have been model fit to the points.

If the algorithm determines that the cameras 20-26 are properly calibrated and model fitting to the image points 150, 152, 154, 156, 158 and 160 should be performed, the algorithm fits a polynomial model with weights for the image points on each side of the vehicle 10 instead of the linear model that was used in the low-end approach. The process of assigning the weights to each image point is the same as discussed above, where it would depend on the factors and parameters that are available and the system that the lane sensing technique is being used in. FIG. 10 is an illustration of the image points from the individual images as shown in FIG. 8, where lines 180 and 182 have been fit to the left side image points and the right side image points respectively using the polynomial model.

As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion disclosed and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for sensing a travel lane in a roadway that a vehicle is traveling along, said vehicle including a front-view camera mounted to a front of the vehicle, a left-side view camera mounted to a left side of the vehicle, a right-side view camera mounted to a right side of the vehicle and a rear-view camera mounted to a rear of the vehicle, said roadway including a left-side roadway boundary line at a left side of the lane and a right-side roadway boundary line at a right side of the lane, said method comprising:
   providing image data from the front-view camera, the left-side view camera, the right-side view camera and the rear-view camera as consecutive image frames of the front of the vehicle, the left side of the vehicle, the right side of the vehicle and the rear of the vehicle;
   constructing a top-down view image of the vehicle for each of the consecutive image frames that combines all of the image data from the front-view camera, the left-side view camera, the right-side view camera and the rear-view camera where the vehicle is shown at the center of the top-down view image;
   detecting a representation of the left-side boundary line and the right-side boundary line in the top-down view image;
   calibrating an orientation of each of the front-view camera, the left-side view camera, the right-side view camera and the rear-view camera using the representation of the left-side roadway boundary line and the right-side roadway boundary line in the top-down view image;
   performing a camera diagnosis process to provide temporal constraint analysis and spatial constraint analysis, where the temporal constraint analysis determines whether consecutive top-down view image frames are co-linear, are at the same angle and are at the same offset within a temporal constraint threshold and where the spatial constraint analysis determines that the representation of the lane lines in the top-down view image that extend across boundaries from one image generated by one camera to another image generated by another camera are straight and have the same angle within a spatial constraint threshold;
   re-calibrating the orientation of each of the front-view camera, the left-side view camera, the right-side view camera and the rear-view camera if the temporal constraint threshold and the spatial constraint threshold are not met; and
   using a model fitting process to identify the boundary lines in the top-down view image if the temporal constraint threshold and the spatial constraint threshold are met.

2. The method according to claim 1 wherein the representation of the left-side and right-side boundary lines are a series of image points.

3. The method according to claim 2 wherein using a model fitting process includes using a linear model based on weights given to each of the separate image points.

4. The method according to claim 3 wherein the weights are assigned based on a plurality of factors including camera view points, vehicle dynamic errors, calibration errors, visibility and reliability in the image and a lane sensing application.

5. The method according to claim 2 wherein detecting a representation of the boundary lines includes converting the image points to vehicle coordinates.

6. The method according to claim 1 further comprising providing a lighting normalization process to the top-down view image prior to the top-down view image being used to detect the representation of the left-side and right-side boundary lines.

7. The method according to claim 1 wherein performing a camera diagnosis process includes determining whether the representation of the left-side and right-side boundary lines are solid long lines or short dashed lines.

8. The method according to claim 7 wherein performing the camera diagnosis includes using the front-view camera if the vehicle is traveling in a forward direction and using the rear-view camera if the vehicle is traveling in a rearward direction to determine whether the representation of the boundary lines are the long solid lines or the short dashed lines.

9. The method according to claim 1 further comprising using vehicle motion compensation to enhance the representation of the left-side roadway boundary line and the right-side roadway boundary line in the top-down view image prior to performing the camera diagnosis process.

10. A method for sensing a travel lane in a roadway that a vehicle is traveling along, said vehicle including a front-view camera mounted to a front of the vehicle, a left-side view camera mounted to a left side of the vehicle, a right-side view camera mounted to a right side of the vehicle and a rear-view camera mounted to a rear of the vehicle, said roadway including a left-side roadway boundary line at a left side of the lane and a right-side roadway boundary line at a right side of the lane, said method comprising:

providing image data from the front-view camera, the left-side view camera, the right-side view camera and the rear-view camera as consecutive image frames of the front of the vehicle, the left side of the vehicle, the right side of the vehicle and the rear of the vehicle;

providing a combined image that combines each of the images from the front-view camera, the left-side view camera, the right-side view camera and the rear-view camera that includes a representation of the left-side boundary line and the right-side boundary line;

providing camera calibration to separately calibrate an orientation of each of the front-view camera, the left-side view camera, the right-side view camera and the rear-view camera using either the representation of the left-side road boundary line or the right-side road boundary line in the images from the camera;

performing a camera diagnosis process to provide temporal constraint analysis and spatial constraint analysis of the combined image, where the temporal constraint analysis determines whether consecutive combined image frames are co-linear, are at the same angle and are at the same offset within a temporal constraint threshold and where the spatial constraint analysis determines that the representation of the lane lines in the combined view image that extend across boundaries from one image generated by one camera to another image generated by another camera are straight and have the same angle within a spatial constraint threshold;

recalibrating the orientation of one or more of the front-view camera, the left-side view camera, the right-side view camera and the rear-view camera if the temporal constraint threshold and the spatial constraint threshold are not met; and model fitting the representation of the left-side boundary line and the right-side boundary line in the combined image to the left side and right side boundary lines if the temporal constraint threshold and the spatial constraint threshold are met.

11. The method according to claim 10 wherein the representation of the left-side and right-side boundary lines are a series of image points.

12. The method according to claim 10 wherein model fitting includes using a polynomial model based on weights given to each of the separate image points.

13. The method according to claim 12 wherein the weights are assigned based on a plurality of factors including camera view points, vehicle dynamic errors, calibration errors, visibility and reliability in the image and a lane sensing application.

14. The method according to claim 10 wherein performing a camera diagnosis process includes transforming the representation of the lines to top-down view coordinates.

15. The method according to claim 10 further comprising providing a lighting normalization process for the combined image.

16. The method according to claim 10 wherein performing a camera diagnosis process includes determining whether the representation of the left-side and right-side boundary lines are solid long lines or short dashed lines.

17. The method according to claim 16 wherein performing the camera diagnosis includes using the front-view camera if the vehicle is traveling in a forward direction and using the rear-view camera if the vehicle is traveling a rearward direction to determine whether the representation of the boundary lines are the long solid lines or the short dashed lines.

18. The method according to claim 10 further comprising using vehicle motion compensation to enhance the representation of the left-side roadway boundary line and the right-side roadway boundary line in the combined image prior to performing the camera diagnosis process.

19. A system for sensing a travel lane in a roadway that a vehicle is traveling along, said vehicle including a front-view camera mounted to a front of the vehicle, a left-side view camera mounted to a left side of the vehicle, a right-side view camera mounted to a right side of the vehicle and a rear-view camera mounted to a rear of the vehicle, said roadway including a left-side roadway boundary line at a left side of the lane and a right-side roadway boundary line at a right side of the lane, said system comprising:

means for providing image data from the front-view camera, the left-side view camera, the right-side view camera and the rear-view camera as consecutive image frames of the front of the vehicle, the left side of the vehicle, the right side of the vehicle and the rear of the vehicle;

means for constructing a top-down view image of the vehicle for each of the consecutive image frames that combines all of the image data from the front-view camera, the left-side view camera, the right-side view camera and the rear-view camera where the vehicle is shown at the center of the top-down view image;

means for detecting a representation of the left-side boundary line and the right-side boundary line in the top-down view image;

means for calibrating an orientation of each of the front-view camera, the left-side view camera, the right-side view camera and the rear-view camera using the representation of the left-side roadway boundary line and the right-side roadway boundary line in the top-down view image;

means for performing a camera diagnosis process to provide temporal constraint analysis and spatial constraint analysis, where the temporal constraint analysis determines whether consecutive top-down view image frames are co-linear, are at the same angle and are at the same offset within a temporal constraint threshold and where the spatial constraint analysis determines that the representation of the lane lines in the top-down view image that extend across boundaries from one image generated by one camera to another image generated by another camera are straight and have the same angle within a spatial constraint threshold;

means for re-calibrating the orientation of each of the front-view camera, the left-side view camera, the right-side view camera and the rear-view camera if the temporal constraint threshold and the spatial constraint threshold are not met; and means for using a model fitting process to identify the boundary lines in the top-down view image if the temporal constraint threshold and the spatial constraint threshold are met.

* * * * *